(12) United States Patent
Li et al.

(10) Patent No.: US 10,110,861 B2
(45) Date of Patent: Oct. 23, 2018

(54) LIGHT SOURCE SYSTEM AND PROJECTION SYSTEM

(71) Applicant: APPOTRONICS CHINA CORPORATION, Shenzhen (CN)

(72) Inventors: Yi Li, Shenzhen (CN); Hong Ye, Shenzhen (CN); Zeqin Wang, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 0 days.

(21) Appl. No.: 15/301,198

(22) PCT Filed: Apr. 1, 2015

(86) PCT No.: PCT/CN2015/075652
§ 371 (c)(1),
(2) Date: Sep. 30, 2016

(87) PCT Pub. No.: WO2015/149700
PCT Pub. Date: Oct. 8, 2015

(65) Prior Publication Data
US 2017/0019645 A1   Jan. 19, 2017

(30) Foreign Application Priority Data
Apr. 2, 2014 (CN) .......................... 2014 1 0132297

(51) Int. Cl.
*G03B 21/20* (2006.01)
*H04N 9/31* (2006.01)
(Continued)

(52) U.S. Cl.
CPC ......... *H04N 9/3114* (2013.01); *G02B 26/008* (2013.01); *G02B 27/141* (2013.01);
(Continued)

(58) Field of Classification Search
CPC ........ G02B 26/00; G02B 27/14; G02B 27/10; G03B 21/00; G03B 21/20; G03B 33/12;
(Continued)

(56) References Cited

U.S. PATENT DOCUMENTS 5,612,753 A   3/1997 Poradish et al.
5,905,545 A   5/1999 Poradish et al.
(Continued)

FOREIGN PATENT DOCUMENTS

CN   102854730 A   1/2013
CN   103353091 A   10/2013
(Continued)

OTHER PUBLICATIONS

International Search Report in the parent PCT application No. PCT/CN2015/075652, dated Jun. 19 2015.
(Continued)

*Primary Examiner* — Sultan Chowdhury
*Assistant Examiner* — Danell L Owens
(74) *Attorney, Agent, or Firm* — Chen Yoshimura LLP

(57) ABSTRACT

A light source system and projection system, the light source system comprising: a first light source (1) producing first wide spectrum light, a second light source (103) producing second wavelength light, a light splitting and light combining device (2) used to split and combine light, a first spatial light modulator (106), a second spatial light modulator (107), and a control device (108) controlling the first light source (1) and the second light source (103) and modulating the first spatial light modulator (106) and the second spatial light modulator (107). The projection system comprises the light source system. The light source system and projection system have high brightness and wide color gamut, effectively eliminating rainbow effect, and also have a simple structure and low cost.

24 Claims, 10 Drawing Sheets

(51) Int. Cl.
  *G03B 33/12* (2006.01)
  *G03B 21/00* (2006.01)
  *G02B 26/00* (2006.01)
  *G02B 27/14* (2006.01)
(52) U.S. Cl.
  CPC ......... *G03B 21/005* (2013.01); *G03B 21/204* (2013.01); *G03B 21/208* (2013.01); *G03B 21/2013* (2013.01); *G03B 33/12* (2013.01); *H04N 9/3111* (2013.01); *H04N 9/3155* (2013.01); *H04N 9/3158* (2013.01); *H04N 9/3161* (2013.01); *H04N 9/3164* (2013.01)
(58) Field of Classification Search
  CPC ..... H04N 9/31; H04N 5/74; F21S 2/00; F21S 13/00; F21V 9/10
  See application file for complete search history.

(56) References Cited

U.S. PATENT DOCUMENTS

| | | | |
|---|---|---|---|
| 6,877,882 | B1 | 4/2005 | Haven et al. |
| 2004/0090679 | A1 | 5/2004 | Kowarz |
| 2007/0273796 | A1* | 11/2007 | Silverstein ............... G02B 5/10 348/752 |
| 2007/0285622 | A1 | 12/2007 | Hsiung et al. |
| 2008/0055562 | A1 | 3/2008 | Zhang et al. |
| 2008/0180640 | A1 | 7/2008 | Ito |
| 2011/0292350 | A1 | 12/2011 | Kasazumi et al. |
| 2012/0257124 | A1 | 10/2012 | Huang |
| 2013/0016323 | A1 | 1/2013 | Huang |
| 2013/0229628 | A1 | 9/2013 | Akiyama et al. |
| 2013/0342904 | A1 | 12/2013 | Richards |
| 2015/0253654 | A1* | 9/2015 | Hu ..................... G03B 21/20 353/31 |

FOREIGN PATENT DOCUMENTS

| | | |
|---|---|---|
| CN | 103424961 A | 12/2013 |
| CN | 103430555 A | 12/2013 |
| JP | 2000-347323 A | 12/2000 |
| JP | 2007017536 A | 1/2007 |
| JP | 2013-182207 A | 9/2013 |
| JP | 2014021223 A | 2/2014 |
| TW | 200801640 A | 1/2008 |
| TW | 201307756 A | 2/2013 |
| WO | 2013/017111 A1 | 2/2013 |

OTHER PUBLICATIONS

IPRP in the parent PCT application No. PCT/CN2015/075652, dated Oct. 4, 2016.
Supplementary European Search Report and Written Opinion, dated Mar. 9, 2017, in a counterpart EP application, No. EP 15772363.6.
Chinese Office Action, dated Sep. 4, 2017 in a counterpart Chinese patent application, No. CN 201410132297.7.
Taiwanese Office Action, dated Jan. 5, 2016, in a counterpart Taiwanese patent application, No. TW 104110693.
Japanese Office Action, dated Oct. 3, 2017 in a counterpart Japanese patent application, No. JP 2016-560780.

* cited by examiner

LIGHT SOURCE SYSTEM AND PROJECTION SYSTEM

BACKGROUND OF THE INVENTION

Field of the Invention

This invention relates to optical display technologies, and in particular, it relates to a light source system and a projection system.

Description of Related Art

With the development of projection display technologies, the technology has developed from the original single-chip DMD (Digital Micromirror Device) projection systems to three-chip DMD projection systems.

In conventional single-chip DMD display technology, the light source is a white light source. The white light is filtered to sequentially generate red, green and blue primary color lights; the red, green and blue lights are sequentially inputted to the DMD, and processed by the DMD to be output. Although such single-chip DMD projection systems have a simple structure, its light utilization efficiency is very low, as most light is loss in the filtering step. This results in low brightness of the projection system. Moreover, by using a single DMD to sequentially process the red, green and blue lights, the color switching speed is limited, causing a "rainbow" effect. To solve the above problems, three-chip DMD projection technology is developed. A three-chip DMD projection system uses a white light source; the white light is split by a prism into red, green and blue primary color lights which are inputted to three DMDs, which separately process the received lights. Compared to single-chip DMD projection systems, three-chip DMD projection systems have higher light utilization efficiency. But such a system has a relatively complex structure and are more difficult to install, and are relatively costly.

How to balance the need for higher light utilization efficiency and overall cost is a challenge in this area of technology. In response, two-chip DMD projection systems are developed. For example, U.S. Pat. No. 5,612,753 and US Pat. Appl. Pub. No. 2012/0257124 disclose two-chip DMDs. Although such systems have a relatively simple structure as compared to three-chip DMD, their brightness is not ideal, and they still cannot fully solve the undesirable "rainbow" problem. Therefore, there is a need for a new of light source system, which can deliver high brightness and solve the problem of the "rainbow" effect at the same time.

SUMMARY

An object of the present invention is to provide a light source system and a projection system which substantially obviates the problems of low brightness and "rainbow" effect of the conventional art.

In one aspect, the present invention provides a light source system which includes: a first light source for generating a first wide spectrum light; a second light source for generating a second wavelength light; a light splitting and light combining device, disposed on the light paths of the first light source and the second light source, for splitting the first wide spectrum light generated by the first light source into a third light travelling along a first path and a fourth wavelength light travelling along a second path, and for directing at least a part of the second wavelength light from the second light source to travel along the second path; a first spatial light modulator, for receiving light from the first path and modulate the received light; a second spatial light modulator, for receiving light from the second path and modulate the received light; and a control device, electrically coupled to the first light source, the second light source, the first spatial light modulator and the second spatial light modulator, for controlling the first light source and the second light source, and controlling the first spatial light modulator and the second spatial light modulator to modulate light, wherein wavelength ranges of the first wide spectrum light and the second wavelength light are different, and wavelength ranges of the third wavelength light and the fourth wavelength light are different.

Preferably, the second wavelength light generated by the second light source is a wide spectrum light.

Preferably, the second wavelength light is a cyan light, and the first wide spectrum light is a yellow light.

Preferably, the second light source includes: a second excitation light source for generating a second excitation light; a second wavelength conversion device, disposed on a light path of the second excitation light, for absorbing the second excitation light to generate a converted light; and a second drive device for drive the second wavelength conversion device to move horizontally, vertically or in a circular motion.

Preferably, the second wavelength conversion device includes: a wavelength conversion layer; and a substrate for carrying the wavelength conversion layer.

Preferably, the second wavelength conversion device includes: a substrate; a wavelength conversion layer; and a scattering layer, wherein the substrate carries the wavelength conversion layer and the scattering layer, wherein the wavelength conversion layer is disposed between the substrate and the scattering layer, or the scattering layer is disposed between the substrate and the wavelength conversion layer.

Preferably, the light splitting and light combining device splits the second wavelength light into a fifth wavelength light travelling along the first path and a sixth wavelength light travelling along the second path.

Preferably, the control device controls the first spatial light modulator to modulate the third wavelength light and the fifth wavelength light, and controls the second spatial light modulator to modulate the fourth wavelength light and the sixth wavelength light.

Preferably, the light splitting and light combining device includes a first reflector, a first dichroic element, a second reflector, a TIR (total internal reflection) prism and a Philips prism; wherein the first reflector and the first dichroic element are disposed in parallel, for combining the first wide spectrum light and the second wavelength light using wavelength-based light combination; wherein the second reflector reflects the second wavelength light and the first wide spectrum light into the TIR prism; wherein the Philips prism spits the light reflected by the TIR prism, into a light travelling along the first path and a light travelling along the second path.

Preferably, the light splitting and light combining device further includes a light homogenization device, disposed between the first dichroic element and the second reflector, for homogenizing the first wide spectrum light and the second wavelength light.

Preferably, the fourth wavelength light and the fifth wavelength light have the same color but different dominant wavelengths.

Preferably, the second light source is a solid state semiconductor light emitting device, which emits one of three primary color lights.

Preferably, the second light source is a laser diode or a laser diode array.

Preferably, the light splitting and light combining device includes a first dichroic element and a second dichroic element, wherein the first dichroic element splits the first wide spectrum light into a third light which is guided by it to travel along the first path and a fourth wavelength light which is reflected by it into the second dichroic element, and wherein the second dichroic element guides the second wavelength light and the fourth wavelength light to travel along the second path.

Preferably, the second light source includes a second excitation light source, a scattering device and a drive device; wherein the second excitation light source is a solid state semiconductor light emitting device, for generating any one of the primary color lights; wherein the scattering device is disposed on the light path of the second excitation light source, for scattering the light generated by the second excitation light source; wherein the second drive device drives the scattering device to move. In any of the above systems, the first light source includes: a first excitation light source; a first wavelength conversion device; and a first drive device; wherein the first excitation light source generates a excitation light; wherein the first excitation light source is a solid state semiconductor light emitting device; wherein the first wavelength conversion device is disposed on a light path of the first excitation light, for absorbing the excitation light to generate a converted light; wherein the first drive device drives the first wavelength conversion device to move.

Preferably, the first wavelength conversion device includes: a wavelength conversion layer, and a substrate for carrying the wavelength conversion layer; wherein the wavelength conversion layer contains a yellow phosphor material.

Preferably, the first wavelength conversion device includes: a wavelength conversion layer, a scattering layer, and a substrate for carrying the wavelength conversion layer and the scattering layer; wherein the wavelength conversion layer is disposed between the scattering layer and the substrate.

Preferably, the first excitation light source is a laser diode or laser diode array.

In any of the above systems, the first light source is a solid state semiconductor light emitting device.

In any of the above systems, the control device controls the first light source and the second light source to sequentially turn ON/OFF, wherein the ON states of the first light source and the second light source do not overlap within a same period.

In any of the above systems, the control device controls the first light source and the second light source to turn OF/OFF, wherein the ON states of the first light source and the second light source partially overlap but do not completely overlap within a same period.

In any of the above systems, within a period, the first light source and the second light source are each turned ON/OFF at least N times, where N is a natural number.

Embodiments of the present invention further include a projection system, which includes any one of the above light source systems.

In the above embodiments, by using a wide spectrum light, and by using a control device to control two spatial light modulators to modulate the wide spectrum light, the lights obtained by splitting the wide spectrum light are simultaneously modulated by the two spatial light modulators without loss of light, which increases the brightness of the light source system. Meanwhile, by using two spatial light modulators controlled by a control device to modulate the light, while ensuring the brightness of the light source system, the overall structure of the light source system can be made simpler and relatively low-cost.

DETAILED DESCRIPTION OF PREFERRED EMBODIMENTS

Details of the various embodiments of the present invention are described below with reference to the drawings.

In the following disclosures, the three primary color lights are red, green and blue lights. A period refers to the time period for processing one frame of image.

Figure 1:
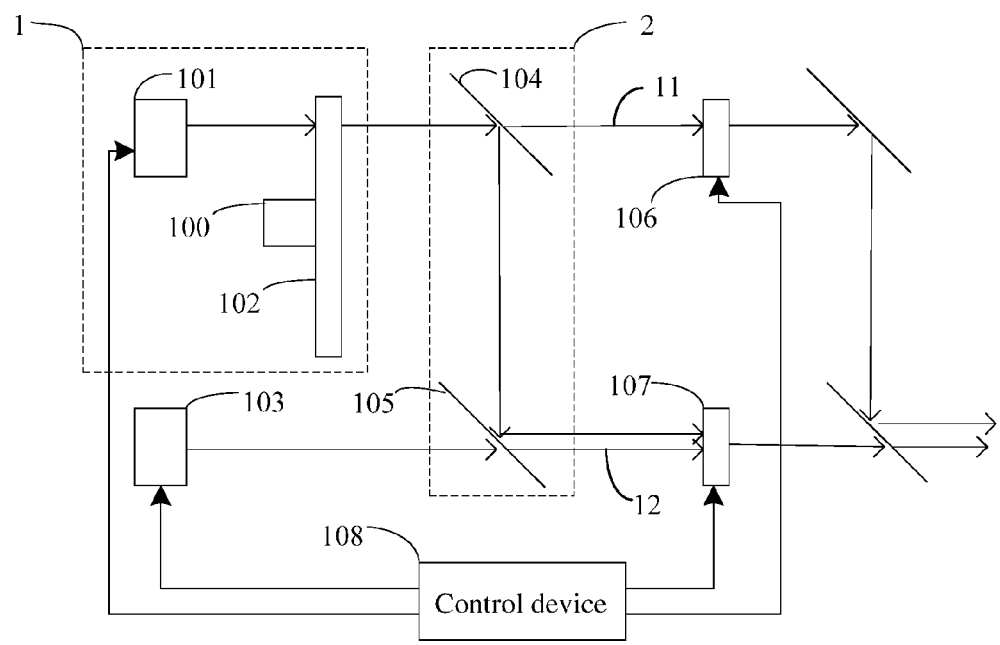
FIG. 1 schematically illustrates the structure of a light source system according to a first embodiment of the present invention.

A light source system according to a first embodiment of the present invention is described with reference to FIGS. 1 to 7. FIG. 1 schematically illustrates the structure of the light source system according to the first embodiment of the present invention. The light source system includes: a first light source 1, a second light source 103, a light splitting and light combining device 2, a first spatial light modulator 106, a second spatial light modulator 107, and a control device 108. The first light source 1 and the second light source 103 are located on the same side of the light splitting and light combining device 2, and the light splitting and light combining device 2 is located on the output light path of the first light source 1, and also located on the output light path of the second light source 103. The light splitting and light combining device splits the light from the first light source 1 or the second light source 103, and directs the lights into the first spatial light modulator 106 or the second spatial light modulator 107. The control device 108 is electrically coupled to the first light source 1, the second light source 103, the first spatial light modulator 106 and the second spatial light modulator 107.

Figure 2A:
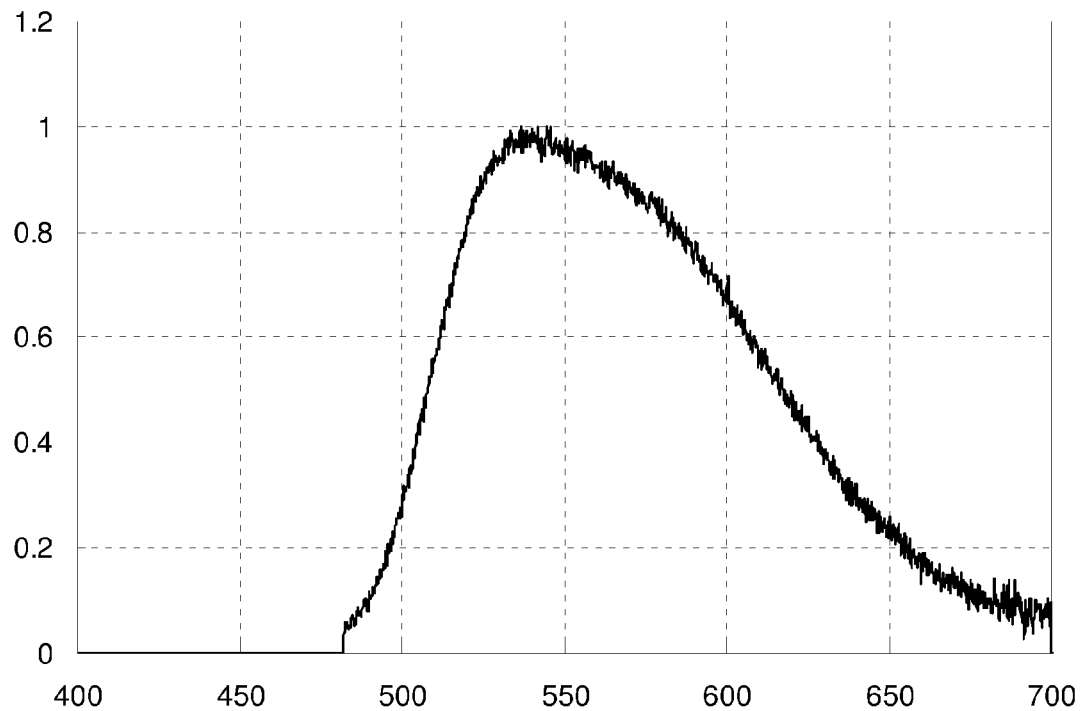
FIGS. 2A and 2B show the spectra of the lights in the first embodiment.
Figure 2B:
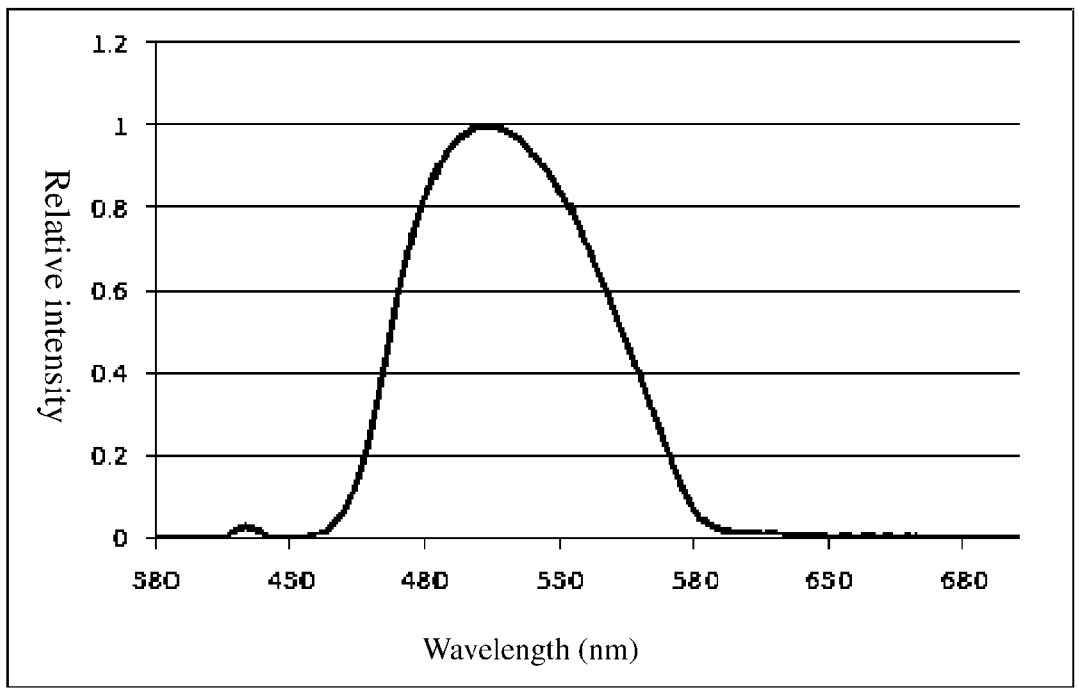

(1) The first light source 1 generates a first wide spectrum light, the spectrum of which covers at least a 10 nm range, for example: a yellow light covering 475 nm to 700 nm (see FIG. 2A), or a cyan light covering 440 nm to 580 nm (see FIG. 2B). Preferably, the spectrum of the first wide spectrum light covers at least a 30 nm range. In this embodiment of the invention, the first light source 1 employs a wide spectrum light, which can be split into at least two light beams using wavelength-based light separation, where the two light beams have the same timing sequence. This design not only simplifies the structure of the light source (avoiding using multiple light sources as in conventional technology), but also increases light utilization efficiency (it is not necessary to use a red phosphor to generate a red converted light). At the same time, it can provide primary color lights without having to use additional optical devices to filter the light, which further simplifies the structure. For example, a wide spectrum yellow light can be split based on wavelength to obtain a green light and a red light; a wide spectrum cyan light can be split based on wavelength to obtain a blue light and a green light.

The first light source 1 includes an excitation light source 101 for generating an excitation light, a wavelength conversion device 102, and a first drive device 100. The wavelength conversion device 102 is located on the light path of the excitation light source 101. The first drive device 100 drives the wavelength conversion device to move. The excitation light source 101 is a solid state semiconductor light emitting device. Preferably, the excitation light source 101 can generate a blue or a UV excitation light. More preferably, the excitation light source 101 is a laser diode (LD) or a light emitting diode (LED) or a combination of the two that can generate a blue or a UV light. The excitation light source may also be an array of the above light sources, i.e., an LD array, or an LED array, or an array of combination of LDs and LEDs. Preferably, the excitation light source 101 uses LDs as the excitation light sources. Compared to LEDs, LDs not only have lower etendue, but also have higher light intensity and higher power.

The wavelength conversion device 102 includes a substrate and a wavelength conversion layer, where the substrate carries the wavelength conversion layer. The wavelength conversion layer contains a phosphor material that can absorb the excitation light and convert it to a wide spectrum light, such as yellow phosphor, cyan phosphor, magenta phosphor, etc. Preferably, when the substrate is a round shape, the wavelength conversion layer is distributed in a ring shape along the periphery of the substrate, and when the substrate is a rectangular shape, the wavelength conversion layer is distributed in a band shape on the substrate surface. The first drive device 100 drives the wavelength conversion device 102 to move (either a circular movement or a horizontal or vertical linear movement), so that the light spot formed by the excitation light on the wavelength conversion layer acts on the wavelength conversion layer along a predetermined path. Preferably, the first drive device 100 is a drive motor, and the substrate is a round plate, where the motor shaft is located at the center of the substrate.

(2) The second light source 103 generates a second wavelength light, which has a spectral shape different from the first wide spectrum light. The color of the light generated by the second light source 103 is not limited, and can be designed based on the output light of the first light source 1. The light from the first light source 1 after splitting and the light generated by the second light source 103 combined include at least the three primary color lights. Preferably, the light generated by the second light source 103 is any one of the primary colors (i.e. any one of red, green and blue). For example, when the first light source 1 generates a yellow light, which is split into a red light and a green light, then the second light source 103 is preferably a blue light; when the first light source 1 generates a cyan light, which is split into a green light and a blue light, then and the second light source 103 is preferably a red light; etc. Other combinations are also possible. In this embodiment, the second light source 103 may be LEDs or LDs. Preferably, the second light source 103 is a LD or LD array, so that the etendue of the second light source 103 is relatively small and its brightness is relatively high; this also facilitates downstream wavelength-based light combination using the light splitting and light combining device 2.

For convenience, the following descriptions of this embodiment use an example where the wavelength conversion layer is a yellow phosphor and the second wavelength light generated by the second light source 103 is a blue light.

(3) The light splitting and light combining device 2 is used to split the first wide spectrum light into a third wavelength light travelling along the first path 11 and a fourth wavelength light travelling along the second path 12, and direct at least a part of the second wavelength light to travel along the second path 12.

The light splitting and light combining device 2 includes a first dichroic element 104 and a second dichroic element 105. The first dichroic element 104 is located between the first spatial light modulator 106 and the first light source 1, and the second dichroic element 105 is located between the second light source 103 and the second spatial light modulator 107. The first light source 1 outputs a yellow light (i.e., the yellow phosphor is excited to generate a yellow light). The yellow light is input on the first dichroic element 104, and is split into the red third wavelength light and green fourth wavelength light. The first dichroic element 104 is designed to transmit red light and reflect green light, and the second dichroic element 105 is designed to transmit blue light and reflect green light. The red light travels along the first path 11 to enter the first spatial light modulator 106, and the green light is reflected to the second dichroic element 105 and then travels along the second path 12 to enter the second spatial light modulator 107.

A dichroic element is an optical element that can reflect light of one wavelength range and transmit light of another wavelength range, or can reflect light of one or more wavelength ranges and transmit light of one or more other wavelength ranges.

(4) The first spatial light modulator 106 is used to modulate the light traveling along the first path 11. The second spatial light modulator 107 is used to modulate the light traveling along the second path 12. The first spatial light modulator 106 and the second spatial light modulator 107 may include DMD (Digital Micromirror Device) devices, LCD (Liquid Crystal Display) devices, LCOS (Liquid Crystal on Silicon) devices, etc.

The first spatial light modulator 106 modulates the red light, and the second spatial light modulator 107 modulates the blue light and green light in a time sequence. The yellow light is generated by exciting a yellow phosphor, and the yellow light is split into a red light and a green light. On the one hand, yellow phosphors have high light conversion efficiency; on the other hand, the red light and the green light have the same timing, and can both be utilized simultaneously, which greatly increase the light conversion efficiency and utilization efficiency of the light source. When the first light source is a cyan light, the cyan light is split into a blue light and a green light, while the second light source provides the red light, which also increases the light conversion efficiency and utilization efficiency of the light source.

(5) The control device 108 is used to control the first light source 1 and the second light source 103, as well as to control the first spatial light modulator 106 and the second spatial light modulator 107 to modulate the lights.

Figure 3:
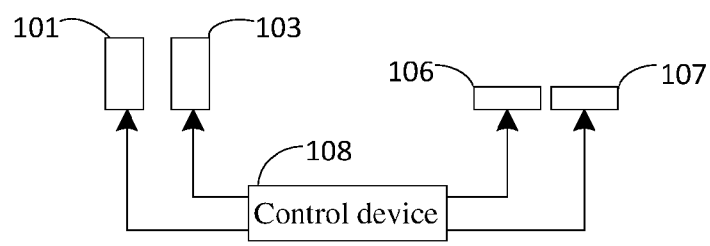
FIG. 3 schematically illustrates the structure of a part of the light source system of the first embodiment.

As shown in FIG. 3, the control device 108 performs pulse width modulation of the first light source 1 and the second light source 103, to achieve control of the brightness and the ON/OFF of the first light source 1 and the second light source 103. The control device 108 controls the first spatial light modulator 106 and the second spatial light modulator 107 to modulate the timing sequence of the lights and the light output amounts.

Figure 4:
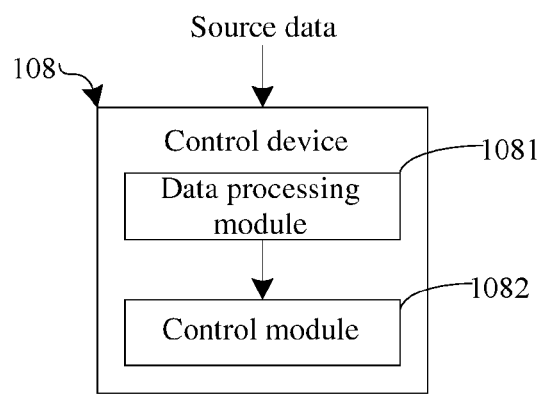
FIG. 4 schematically illustrates the structure of the control device of the first embodiment.

As shown in FIG. 4, the control device 108 may include a data processing module 1081 and a control module 1082. When the source data is inputted to the control device 108, the data processing module 1081 processes the data. Based on the data, the control module 1082 controls the ON/OFF of the first light source 1 and the second light source 103; it further controls the first spatial light modulator 106 and the second spatial light modulator 107 to modulate the light based on the ON/OFF states of the light sources. The source data includes video or image data.

Figure 5:
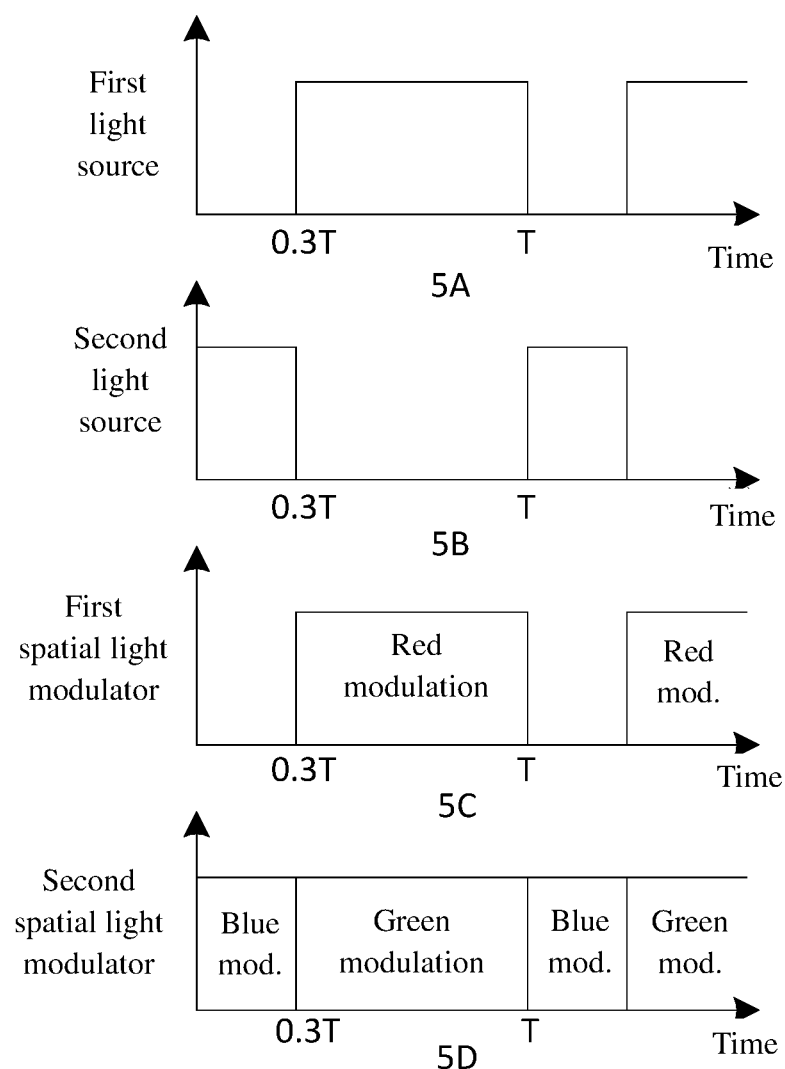
FIG. 5 shows a timing chart of the control sequences of the light sources and spatial light modulators according to the first embodiment.

The control process of the control module 1082 is described below with reference to FIGS. 5-7. The control module 1082 controls the first light source 1 and the second light source 103 to sequentially turn ON/OFF, where the ON states of the first light source and second light source do not overlap within the same period. As shown in FIG. 5, within the same period, during the first 0.3T, the control module 1082 controls the first light source 1 to be OFF and controls the second light source 103 to be ON; the light from the second light source 103 (for example, a blue light) is input to the second spatial light modulator 107 via the second path. The control module 1082 controls the second spatial light modulator 107 to modulate the blue light to output blue light signals corresponding to the video or image data. During 0.3T-1T, the control module 1082 controls the first light source 1 to be ON and controls the second light source 103 to be OFF; the excitation light source 101 of the first light source 1 emits an excitation light, which is input on to the wavelength conversion device 102, so that the wavelength conversion material on the wavelength conversion device 102 generates a converted light, for example, a yellow converted light. The light splitting and light combining device splits the yellow light into a red light and a green light. The red light is input to the first spatial light modulator 106 via the first path, and the green light is input to the second spatial light modulator 107 via the second path. The control module 1082 controls the first spatial light modulator 106 to modulate the ref light so as to output red light signals corresponding to the video or image data, and controls the second spatial light modulator 107 to modulate the green light so as to output green light signals corresponding to the video or image data. The control by the control device 108 of the spatial light modulators is based on the processed data outputted by the data processing module 1081. More specifically, the first spatial light modulator 106 and the second spatial light modulator 107 are controlled to modulate the red, green and blue colors based on the R, G and B values of each pixel of the image frame, so that the color of the output light from the spatial light modulators corresponds to the R, G, B values of each pixel of the image frame, to ensure the high fidelity of the image display. FIG. 5 shows the control module 1082 controls the first light source and the second light source to be sequentially ON and OFF. In practice, the ON/OFF states of the first light source and the second light source can overlap within the same period T, as shown in FIG. 6.

Figure 6:
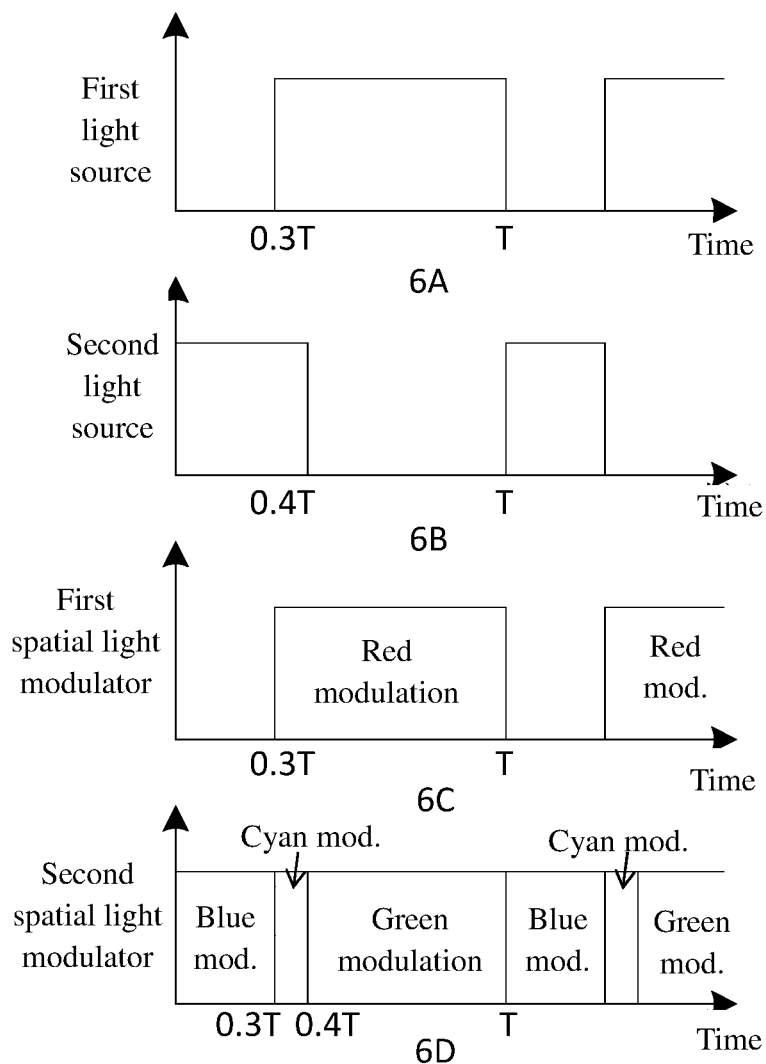
FIG. 6 shows another timing chart of the control sequences of the light sources and spatial light modulators according to the first embodiment.
Figure 7:
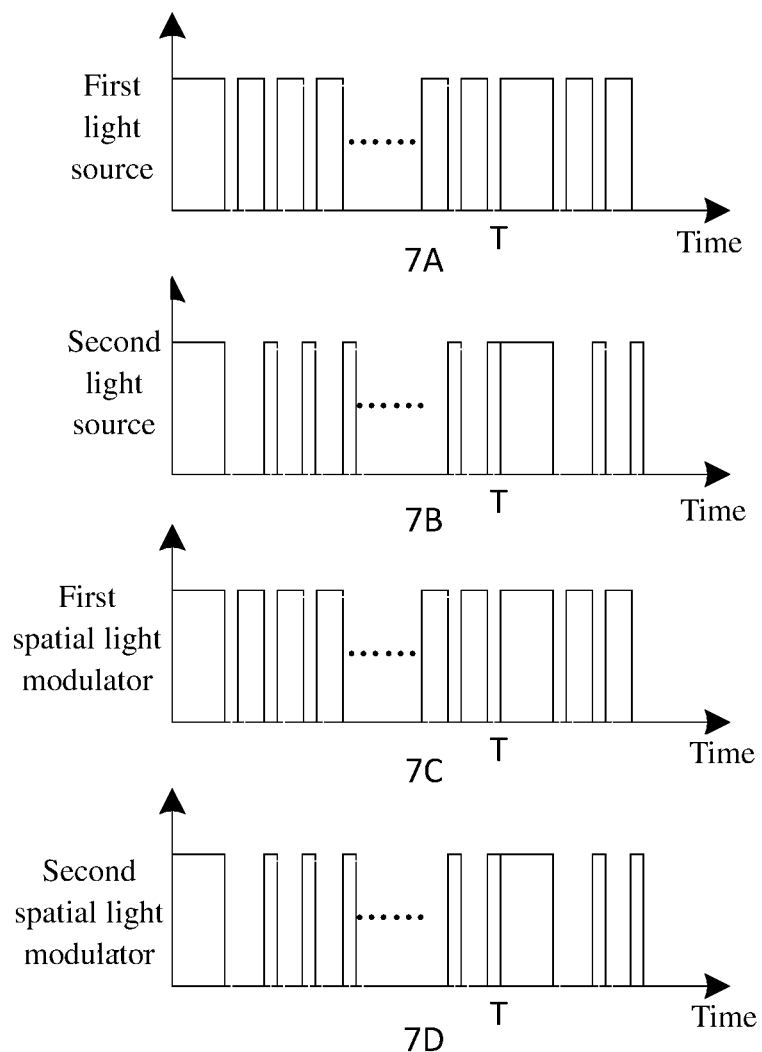
FIG. 7 shows yet another timing chart of the control sequences of the light sources and spatial light modulators according to the first embodiment.

Here, only the differences between FIG. 6 and FIG. 5 are described. The control module controls the ON/OFF of the first light source and the second light source, where the ON state of the first light source 1 and the second light source 103 at least partially overlap within the same period. As shown in FIG. 6, in the same period, the ON intervals of the first light source 1 and the second light source 103 may overlap, for example in time interval 0.3T-0.4T, the first light source 1 and the second light source 103 are both ON (see panels 6A and 6B); at this time, the first spatial light modulator 106 modulates the red light during 0.3T-0.4T (see panel 6C), and the second spatial light modulator 107 modulates the cyan light (see panel 6D), where the cyan light is a combined light of the blue light and green light. This modulation mode can increase the brightness of the output light of the spatial light modulators. This modulation mode is equivalent to adding a cyan primary color light, which expands the color gamut and increases output brightness.

Of course, the first light source 1 and the second light source 103 turn ON/OFF at least N times (N being a natural number) within one period. This is explained with reference to FIG. 7. The control module 1082 performs pulse width modulation (PWM) for the first light source 1 and the second light source 103. There are no special limitations on the duty cycles of the first light source 1 and the second light source 103; for example, the duty cycle of the first light source 1 may be 60% and that of the second light source 103 may be 40% or 50%, etc. In this embodiment, by increasing the color switching speed in the time domain, the "rainbow" effect may be eliminated.

In this embodiment, the first light source 1 generates a wide spectrum light, and the second light source 103 generates any one of the three primary color lights; the control device controls the two light sources, and controls the spatial light modulators to modulate lights, such that the lights from both the first light source 1 and the second light source 103 are utilized, which increases the efficiency of the light source. Also, the spatial light modulators can work simultaneously to simultaneously modulate different colored lights, which increases the switching speed of the primary colors, effectively avoiding the "rainbow" effect. Moreover, by using two spatial light modulators, the system structure is relatively simple and the cost is relatively low while maintaining the output brightness of the light source system.

Figure 8:
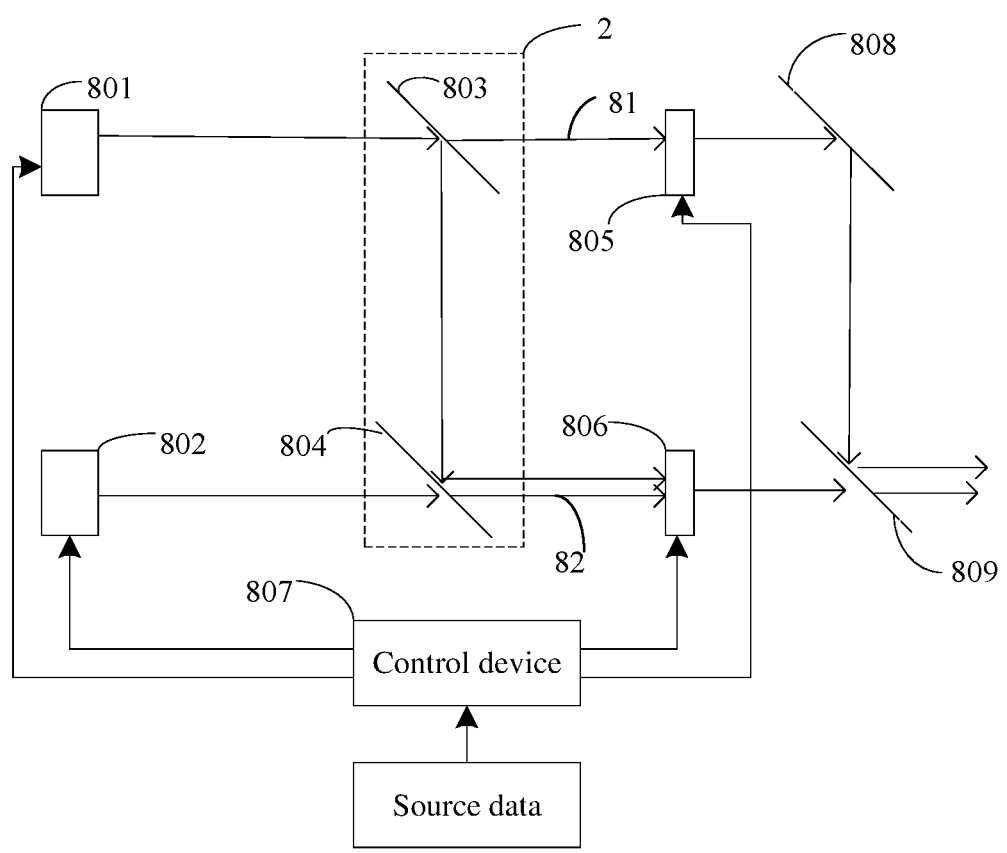
FIG. 8 schematically illustrates the structure of a light source system according to a second embodiment of the present invention.

The second embodiment of the present invention relates to a light source system, explained below with reference to FIG. 8. The light source system includes a first light source 801, a second light source 802, a light splitting and light combining device 2, a first spatial light modulator 805, a second spatial light modulator 806 and a control device 807.

Differences between this embodiment and the first embodiment include: the first light source 801 includes a mixed light source; the a mixed color light generated by the mixed light source is split by the light splitting and light combining device 2 to produce at least two different color lights, which respectively travel along the first path 81 and the second path 82 to be inputted to the first spatial light modulator and second spatial light modulator. The mixed light source includes solid state semiconductor light emitting devices, preferably LED or LD. For example, it may be an LED light source that includes any two of the three primary colors, or an LED chip coated with a wavelength conversion material, or a combination of LEDs and/or LDs of any two of the three primary colors. A mixed light source employing LED and LD can not only increase the brightness of the light source, but also produce a wide spectrum light. The control device 807 controls the mixed light sources of the first light source 801 to simultaneously turn ON/OFF. The light from the mixed light source is directly input a first dichroic element 803 of the light splitting and light combining device 2, and is split into a red light traveling along the first path and a green light traveling along the second path. In this embodiment, the light source of the light source system may be a mixed light sources that does not required a wavelength conversion device, making the overall structure simpler and significantly increase the overall brightness of the light source system.

Figure 9:
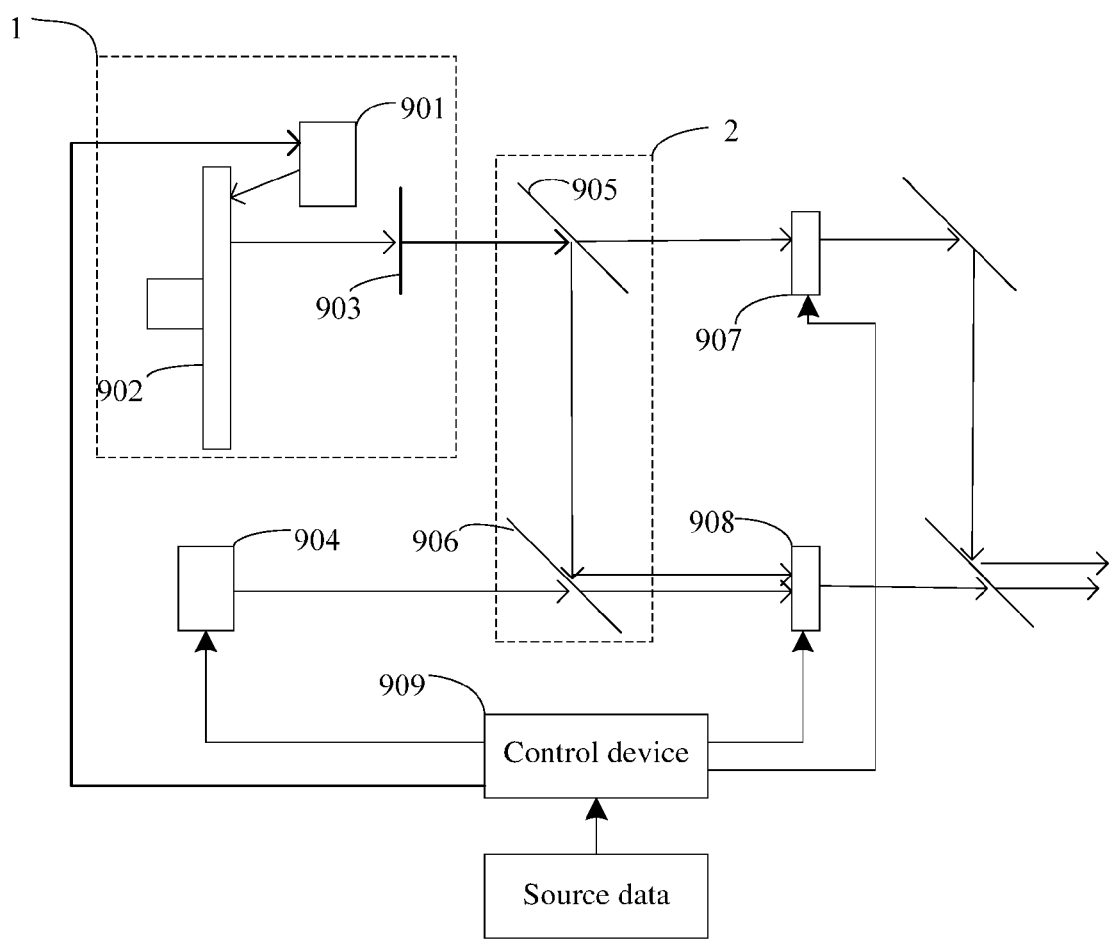
FIG. 9 schematically illustrates the structure of a light source system according to a third embodiment of the present invention.

The third embodiment of the present invention relates to a light source system, explained below with reference to FIG. 9. The light source system includes a first light source 1, a second light source 904, a light splitting and light combining device 2, a first spatial light modulator 907, a second spatial light modulator 908 and a control device 909.

Differences between this embodiment and the first embodiment include: The first light source 1 includes an excitation light source 901 for generating an excitation light, a wavelength conversion device 902 which absorbs the excitation light and converts it to a converted light, and a dichroic filter 903. The wavelength conversion device 902 may be a transmission type device or a reflection type device. When the wavelength conversion device 902 is transmission type (not shown in FIG. 9), the excitation light source 901 is located on a side of the wavelength conversion device 902 that is coated with the wavelength conversion material or the opposite side (i.e. the side farther away from the light splitting and light combining device 2), and the dichroic filter 903 is located between the wavelength conversion device 902 and the excitation light source 901. The dichroic filter 903 transmits the excitation light and reflects the converted light, so that the converted light input onto the dichroic filter 903 is reflected to become the output light of the first light source, which can increase the brightness of the output light. When the wavelength conversion device 902 is a reflection type (shown in FIG. 9), the excitation light source 901 and the dichroic filter 903 are located on the same side of the wavelength conversion device 902, the dichroic filter 903 is located on the light path of the converted light, and the excitation light generated by the excitation light source 901 is incident on the wavelength conversion device at an oblique angle. The dichroic filter 903 transmits the converted light and reflects the excitation light, so as to reflect the un-absorbed excitation light that falls on the dichroic filter 903 back to the wavelength conversion device 902. Such back-reflected light can again be used to excite the wavelength conversion material on the wavelength conversion device 902, so that the excitation light can be fully utilized to generate more converted light, which increases the brightness of the output light.

Further, the light source system of this embodiment may include one or more lenses, for condense or collect the light, so as to reduce light loss during propagation and increase light utilization efficiency. The lenses may be located between the excitation light source and the wavelength conversion device, and/or between the wavelength conversion device and the dichroic filter, and/or between the first light source and the light splitting and light combining device, and/or between the second light source and the light splitting and light combining device, etc. The number of the lenses in the light source system is not limited, and their locations can be determined based on the light collection need.

In the above three embodiments of the present invention, the light splitting and light combining device uses wavelength based light combination to combine the first wide spectrum light and the second wavelength light; this does not increase the etendue of the system, therefore can increase the light generating efficiency and brightness of the projection system.

The fourth embodiment of the present invention relates to a light source system, explained below with reference to FIG. 10. The light source system of this embodiment includes a first light source 1, a second light source 3, a light splitting and light combining device 2, a first spatial light modulator 1013, a second spatial light modulator 1014 and a control device 1015. The light splitting and light combining device 2 is located on the light paths of the first light source 1 and the second light source 3, for splitting or combining the lights from the first light source 1 and the second light source 3 and then directing them to the first spatial light modulator 1013 and the second spatial light modulator 1014. The control device 1015 is electrically coupled to the first light source 1, the second light source 3, the first spatial light modulator 1013 and the second spatial light modulator 1014, to control the first light source 1 and the second light source 3, and to control the first spatial light modulator 1013 and the second spatial light modulator 1014 to modulate light.

Figure 11:
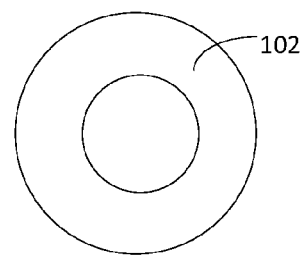
FIG. 11 schematically illustrates the structure of a wavelength conversion device of the fourth embodiment.

(1) The first light source 1 generates a first wide spectrum light, the spectrum of which covers at least a 10 nm range. Preferably, the spectrum of the first wide spectrum light covers at least a 30 nm range. In this embodiment, the first light source 1 may include a first excitation light source 1001 and a first wavelength conversion device 1002. The first excitation light source 1001 is preferably a solid state semiconductor light emitting device, for generating an excitation light. The excitation light may be a blue or a UV light. The wavelength conversion device 1002 includes a wavelength conversion layer (which contains a phosphor material). The first wavelength conversion device 1002 absorbs the excitation light and generates a converted light different from the excitation light. As shown in FIG. 11, the wavelength conversion material is coated in a ring shaped regions 102 of the wavelength conversion device 1002, forming a wavelength conversion layer. The phosphor material may be magenta, red, green, cyan, or yellow phosphor material. In this embodiment, the wavelength conversion layer preferably uses a yellow phosphor, which is excited by the excitation light to generate a yellow light. The yellow light is in the wavelength range of 567 nm-617 nm. Of course, in this embodiment, the first light source 1 may also include a first drive device, for driving the first wavelength conversion device 1002 to move. Preferably, the drive device is a motor. The first excitation light source 1001 is located on one side of the first wavelength conversion device 1002, and the excitation light from the first excitation light source 1001 is incident on the phosphor material of the first wavelength conversion device 1002; the first drive device is located on an area of the first wavelength conversion device 1002 other than where the wavelength conversion is located.

(2) The second light source 3 may generate a wide spectrum light or any one of the three primary color lights. The three primary color lights are red, green and blue lights; the wide spectrum light covers at least a 10 nm range.

Figure 10:
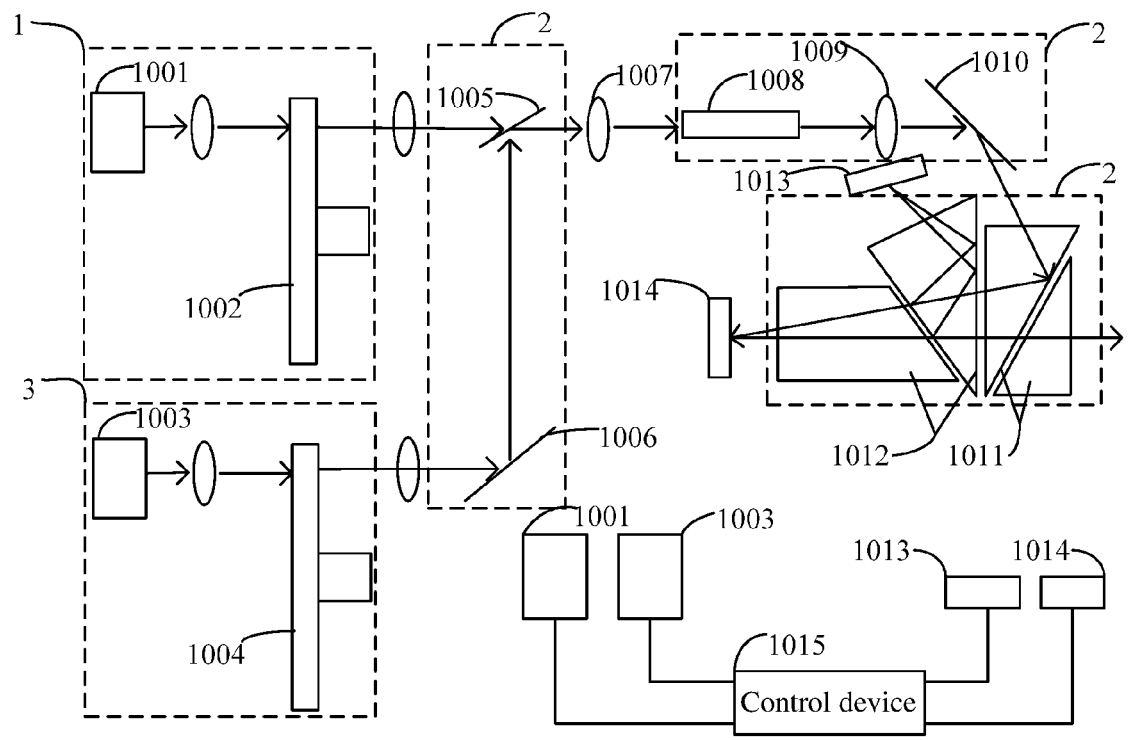
FIG. 10 schematically illustrates the structure of a light source system according to a fourth embodiment of the present invention.

On the one hand, when the light generated by the second light source 3 is any one of the three primary color lights, as shown in FIG. 10, the second light source 3 may include a second excitation light source 1003, and the light it generates is preferably a blue light. The second light source 3 may further include a scattering device 1004, located on the light path of the second excitation light source 1003, for eliminating the coherency of the light of the second excitation light source 1003 in order to reduce speckles. The scattering device 1004 may include a transparent substrate having a scattering material on it. Or, the scattering device may include a transmissive scattering substrate formed of a scattering material. Because heat is generated when light shines on an object, the scattering device 1004 may further include a motor to drive the substrate to move, so that the scattering device 1004 moves. This avoids large amount of heat concentrated on one location of the scattering device 1004 which may affect its scattering efficiency. In this embodiment, the effective scattering region of the scattering device 1004 is located on the light path of the second excitation light source 1003; by using the scattering device, speckles can be effectively eliminated from the ultimate output light.

Figure 12:
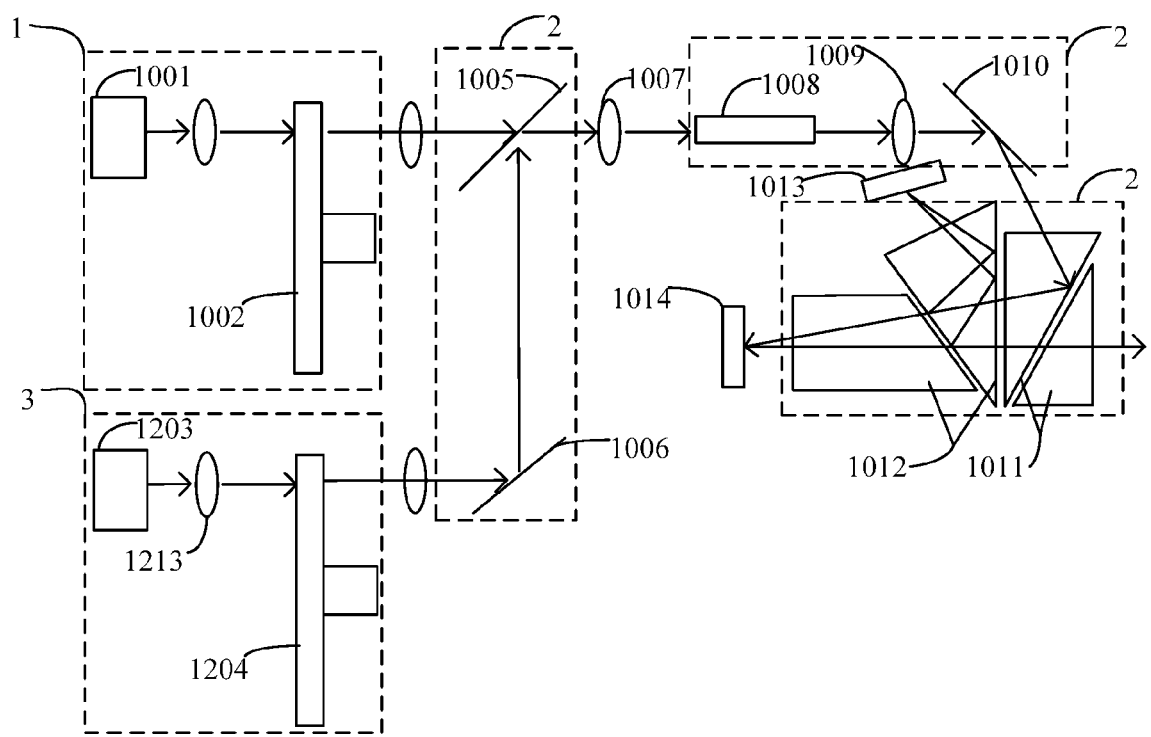
FIG. 12 schematically illustrates another structure of the light source system according to the fourth embodiment of the present invention.
Figure 13:
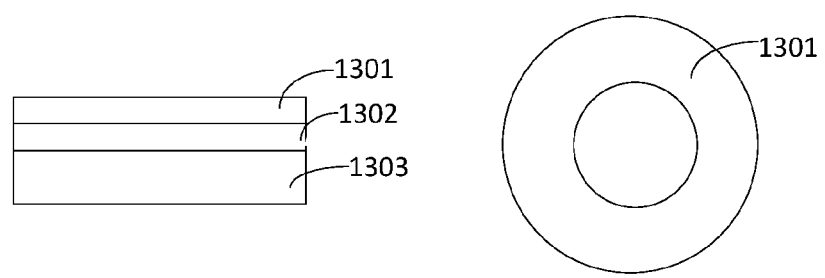
FIG. 13 schematically illustrates another structure of the wavelength conversion device of the fourth embodiment.

On the other hand, when the second light source 3 generates a wide spectrum light, as shown in FIGS. 12 and 13, it may include a second excitation light source 1203, a wavelength conversion device 1204, where the wavelength conversion device 1204 is located on the light path of the second excitation light source 1203. The second excitation light source 1203 may be a solid state semiconductor light emitting device generating a blue or UV light, for generating an excitation light. The wavelength conversion device 1204 includes a substrate 1303 carrying a wavelength conversion layer 1301. The substrate 1303 may be, without limitation, a transmission type substrate of a reflection type substrate. In the illustrated embodiment of FIG. 12, the wavelength conversion device 1204 has a transmission type substrate 1303 (refer to the structure of the first light source shown in FIG. 9 for the structure of a wavelength conversion device using a reflection type substrate). The wavelength conversion layer 1301 preferably includes a magenta phosphor or a cyan phosphor. The wavelength conversion layer 1301 is coated on an outer periphery of the 1303. Further, the wavelength conversion device 1204 may include a scattering layer 1302, located between the wavelength conversion layer 1301 and the substrate 1303; or, the wavelength conversion layer 1301 is located between the scattering layer 1302 and the substrate 1303. The scattering layer 1302 can make the output light of the second light source 3 more uniform, and avoid speckles in the ultimate output light. Also, the scattering layer 1302 and the wavelength conversion layer 1301 may be the same layer; in other words, the scattering material and the wavelength conversion material may be mixed to form a wavelength conversion and scattering layer. This design can simplify the structure of the wavelength conversion device 1204 and make the scattering more uniform.

Further, a lens may be provided between the wavelength conversion device 1204 and the second excitation light source 1203 and on the output light path of the second light source 3, to collect or condense the light. This reduces light loss due to divergent light, thereby increasing the brightness of the output light of the second light source 3.

(3) The light splitting and light combining device 2 is used to split the first wide spectrum light into a third wavelength light travelling along the first path and a fourth wavelength light travelling along the second path, and to direct at least a part of the second wavelength light to travel along the second path.

In this embodiment, the light splitting and light combining device 2 includes, sequentially along the light propagation direction, a first reflector 1006, a dichroic element 1005, a first focusing lens 1007, a light homogenization device 1008, a second first focusing lens 1009, a second reflector 1010, a TIR prism 1011 and a Philips prism 1012. The dichroic element 1005 is located on the output light path of the second light source 3, for reflecting the output light of the second light source 3 to the dichroic element 1005. The dichroic element 1005 is located on the output light path of the first light source 1 (referred to as the first light path here), for transmitting the output light of the first light source and reflecting the output light of the second light source 3 along the first light path. The first focusing lens 1007 focuses the light from the first light path. Preferably, the light homogenization device 1008 includes, without limitation, a light homogenizing rod. The light homogenization device 1008 is located on the first light path, for further homogenizing the light of the first light path. The second first focusing lens 1009 is located on the first light path, for further focusing the light of the first light path. The second reflector 1010 reflects the light from the first light path onto the TIR prism 1011. The TIR prism reflects the light from the first light path to the Philips prism; the Philips prism split the output light of the first light source into a third wavelength light traveling along the first path and a fourth wavelength light traveling along the second path, and directs at least a part of the output light of the second light source (the second wavelength light) to travel along the second path. When the output light of the second light source is a wide spectrum light, the Philips prism splits the output light of the second light source into a fifth wavelength light traveling along the first path and a sixth wavelength light traveling along the second path. The fourth wavelength light and the fifth wavelength light may be lights of the same color but different dominant wavelengths. This design can enhance the color gamut of the light source system. Further, when the output lights of the first light source and the second light source have the same color, but because they have different wavelength ranges, the output lights from the first light source and the second light source can be effectively combined using wavelength based light combination, which does no increase the etendue, and can increase light generating efficiency.

(4) The spatial light modulators include the first spatial light modulator 1013 and the second spatial light modulator 1014. The first spatial light modulator 1013 modulates the light traveling in the first path, and the second spatial light modulator 1014 modulates the light traveling in the second path.

(5) The control device 1015 is used to control the first light source 1001 and the second light source 1003, as well as to control the first spatial light modulator 1013 and the second spatial light modulator 1013 to modulate the lights. The control device 1015 performs pulse width modulation for the first excitation light source 1001 and the second excitation light source 1003, to achieve brightness and ON/OFF control of the first excitation light source 1001 and the second excitation light source 1003. The control of the first spatial light modulator 1013 and second spatial light modulator 1014 by the control device 1015 includes the modulation of the output light amount.

Figure 14:
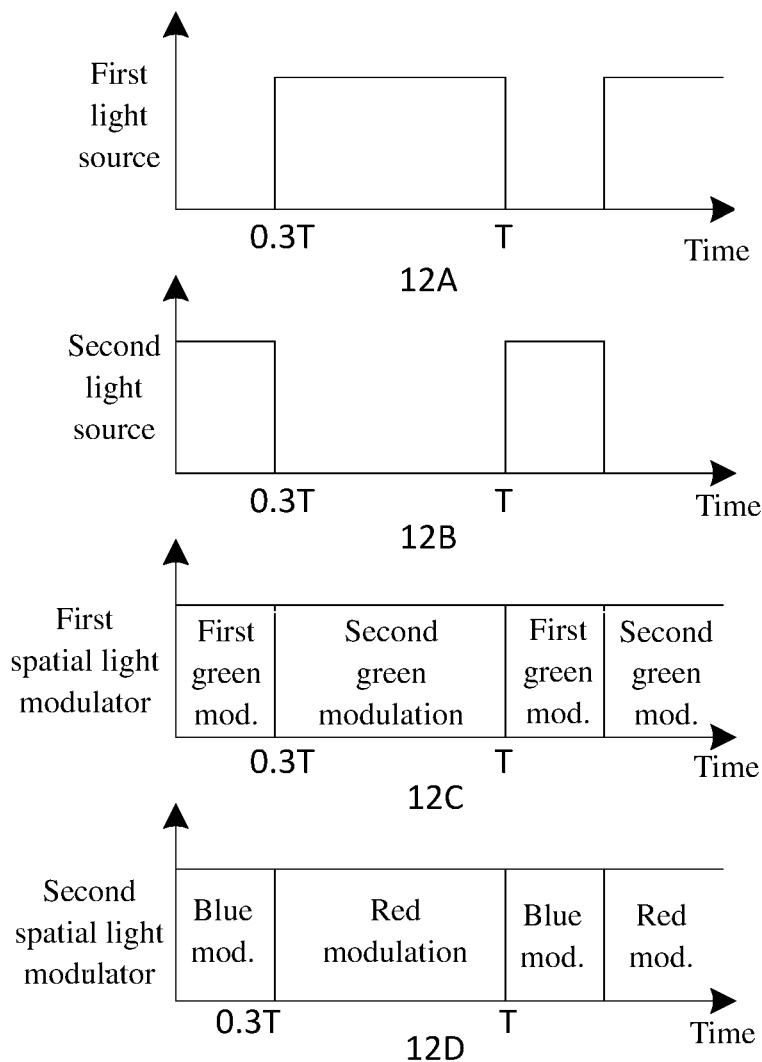
FIG. 14 is a timing chart of the control sequences of the light sources and spatial light modulators according to the fourth embodiment.

The control process performed by the control device 1015 is explained below with reference to FIG. 14. For convenience of explanation, in this embodiment, yellow light is used as an example of the output light of the first light source, and cyan light is used as an example of the output light of the second light source. The yellow light is split by the light splitting and light combining device into a red light and a first green light, and the cyan light is split by the light splitting and light combining device into a second green light and a blue light. In one period, in the first 0.3T, the control device 1015 controls the first light source 1 to be OFF, and controls the second light source 3 to be ON. The light emitted by the second light source 3 is split by the Philips prism; the blue light is input into the second spatial light modulator via the second path, and the second green light is input into the first spatial light modulator via the first path. The control device 1015 controls the second spatial light modulator to modulate the blue light, and controls the first spatial light modulator to modulate the second green light (the modulation is based on the source data after processing by the control device). During 0.3T-1T, the control device 1015 controls the first light source first light source 1 to be ON, and controls the second light source 3 to be OFF. The output light from the first light source 1 is a yellow light, which is split by the Philips prism into the red light and the first green light. The first green light is input into the first spatial light modulator via the first path, and the red light is input into the second spatial light modulator via the second path. The control device 1015 controls the first spatial light modulator to modulate the red light, and controls the second spatial light modulator to modulate the first green light. The first green light and the second light are lights of the same color but different dominant wavelengths; after light combination, a green primary light is obtained. In practice, the output light of the first light source and the output of the second light source may both be any wide spectrum light (as long as the primary lights obtained after splitting include at least three primary lights). The output lights of the first light source and second light source are divided in the time domain, then first combined by the light splitting and light combining device, and then split by the prism. The output light of the first light source is split into two different primary color lights, and the output light of the second light source is split into two different primary color lights; of which, one of the primary color lights split from the first light source and one of the primary color lights split from the second light source are combined to become one primary color light. This can improve the coverage of the color gamut, so that the display image using the output of the light source system is more vivid. In this embodiment, the output light of the first light source may be yellow and the output light of the second light source may be magenta; the color of the two output lights of the first light source and second light source may also be swapped, and the light splitting and light combination principles are the same as described above.

In the example of FIG. 12, the control module 1082 controls the first light source and the second light source to sequentially turn ON/OFF. In practice, the ON/OFF of the first light source and the second light source within the same period T may overlap in time, and the number of their ON/OFF switch within the same period T may be N times (where N is a natural number). By turning the first light source and the second light source ON/OFF multiple times within the same period T, the light switching frequency is increased, which can eliminate the "rainbow" effect.

Using the above embodiment, by using two wide spectrum lights, after splitting them using the light splitting and light combining device and then inputting into two spatial light modulators, there is no loss of light of the light sources; moreover, the two spatial light modulators in the same time interval respectively modulate different color lights, which increase the brightness of the light source system. Further, by using two spatial light modulators to simultaneously process the light, the switching speed of the three primary color lights is increased, which eliminates the "rainbow" effect.

The present invention is also directed to a projector system, which employs a light source system of any one of the above embodiments.

It will be apparent to those skilled in the art that various modification and variations can be made in the light source system and related methods of the present invention without departing from the spirit or scope of the invention. Thus, it is intended that the present invention cover modifications and variations that come within the scope of the appended claims and their equivalents.

What is claimed is:

1. A light source system comprising:
    a first light source for generating a first wide spectrum light, wherein the first light source includes:
        a first excitation light source;
        a first wavelength conversion device; and
        a first drive device;
        wherein the first excitation light source generates an excitation light, the first excitation light source being a solid state semiconductor light emitting device;
        wherein the first wavelength conversion device is disposed on a light path of the first excitation light, for absorbing the excitation light to generate a converted light; and
        wherein the first drive device drives the first wavelength conversion device to move;
    a second light source for generating a second wavelength light;
    a light splitting and light combining device, disposed on light paths of the first light source and the second light source, for splitting the first wide spectrum light generated by the first light source into a third light travelling along a first path and a fourth wavelength light travelling along a second path, and for directing at least a part of the second wavelength light generated by the second light source to travel along the second path, wherein wavelength ranges of the third wavelength light and the fourth wavelength light are different;
    a first spatial light modulator, for receiving light from the first path and modulate the received light;
    a second spatial light modulator, for receiving light from the second path and modulate the received light; and
    a control device, electrically coupled to the first light source, the second light source, the first spatial light modulator and the second spatial light modulator, for controlling the first light source and the second light source and controlling the first spatial light modulator and the second spatial light modulator to modulate light, wherein wavelength ranges of the first wide spectrum light and the second wavelength light are different.

2. The light source system of claim 1, wherein the second wavelength light is a wide spectrum light.

3. The light source system of claim 2, wherein the second wavelength light is a cyan light, and the first wide spectrum light is a yellow light.

4. The light source system of claim 2, wherein the second light source includes:
- a second excitation light source for generating a second excitation light;
- a second wavelength conversion device, disposed on a light path of the second excitation light, for absorbing the second excitation light to generate a converted light; and
- a second drive device for drive the second wavelength conversion device to move horizontally, vertically or in a circular motion.

5. The light source system of claim 4, wherein the second wavelength conversion device includes:
- a wavelength conversion layer; and
- a substrate for carrying the wavelength conversion layer.

6. The light source system of claim 4, wherein the second wavelength conversion device includes:
- a substrate;
- a wavelength conversion layer; and
- a scattering layer,
- wherein the substrate carries the wavelength conversion layer and the scattering layer,
- wherein the wavelength conversion layer is disposed between the substrate and the scattering layer, or the scattering layer is disposed between the substrate and the wavelength conversion layer.

7. The light source system of claim 2, wherein the light splitting and light combining device splits the second wavelength light into a fifth wavelength light travelling along the first path and a sixth wavelength light travelling along the second path.

8. The light source system of claim 7, wherein the control device controls the first spatial light modulator to modulate the third wavelength light and the fifth wavelength light, and controls the second spatial light modulator to modulate the fourth wavelength light and the sixth wavelength light.

9. The light source system of claim 8, wherein the fourth wavelength light and the fifth wavelength light have the same color but different dominant wavelengths.

10. The light source system of claim 7, wherein the light splitting and light combining device includes a first reflector, a first dichroic element, a second reflector, a TIR (total internal reflection) prism and a Philips prism;
- wherein the first reflector and the first dichroic element are disposed in parallel, for combining the first wide spectrum light and the second wavelength light using wavelength-based light combination;
- wherein the second reflector reflects the second wavelength light and the first wide spectrum light into the TIR prism;
- wherein the Philips prism spits the light reflected by the TIR prism, into a light travelling along the first path and a light travelling along the second path.

11. The light source system of claim 10, wherein the light splitting and light combining device further includes a light homogenization device, disposed between the first dichroic element and the second reflector, for homogenizing the first wide spectrum light and the second wavelength light.

12. The light source system of claim 1, wherein the second light source is a solid state semiconductor light emitting device, which emits any one of three primary color lights.

13. The light source system of claim 12, wherein the light splitting and light combining device includes a first dichroic element and a second dichroic element,
- wherein the first dichroic element splits the first wide spectrum light into a third light which is guided by it to travel along the firs path and a fourth wavelength light which is reflected by it into the second dichroic element, and
- wherein the second dichroic element guides the second wavelength light and the fourth wavelength light to travel along the second path.

14. A light source system comprising:
- a first light source for generating a first wide spectrum light;
- a second light source for generating a second wavelength light;
- a light splitting and light combining device, disposed on light paths of the first light source and the second light source, for splitting the first wide spectrum light generated by the first light source into a third light travelling along a first path and a fourth wavelength light travelling along a second path, and for directing at least a part of the second wavelength light generated by the second light source to travel along the second path, wherein wavelength ranges of the third wavelength light and the fourth wavelength light are different;
- a first spatial light modulator, for receiving light from the first path and modulate the received light;
- a second spatial light modulator, for receiving light from the second path and modulate the received light; and
- a control device, electrically coupled to the first light source, the second light source, the first spatial light modulator and the second spatial light modulator, for controlling the first light source and the second light source and controlling the first spatial light modulator and the second spatial light modulator to modulate light, wherein wavelength ranges of the first wide spectrum light and the second wavelength light are different,
- wherein the second light source includes a second excitation light source, a scattering device and a drive device;
- wherein the second excitation light source is a solid state semiconductor light emitting device, for generating any one of the primary color lights;
- wherein the scattering device is disposed on a light path of the second excitation light source, for scattering the light generated by the second excitation light source;
- and wherein the second drive device drives the scattering device to move.

15. The light source system of claim 12, wherein the second light source is a laser diode or a laser diode array.

16. The light source system of claim 1, wherein the control device controls the first light source and the second light source to sequentially turn ON/OFF, wherein ON states of the first light source and the second light source do not overlap within a same period.

17. The light source system of claim 1, wherein the control device controls the first light source and the second light source to turn OF/OFF, wherein ON states of the first light source and the second light source partially overlap but do not completely overlap within a same period.

18. The light source system of claim 1, wherein within a period, the first light source and the second light source are each turned ON/OFF at least N times, N being a natural number.

19. A projection system, comprising the light source system of claims 1.

20. The light source system of claim 1, wherein the first wavelength conversion device includes:
- a wavelength conversion layer; and
- a substrate for carrying the wavelength conversion layer;

wherein the wavelength conversion layer contains a yellow phosphor material.

21. The light source system of claim 1, wherein the first wavelength conversion device includes:
a wavelength conversion layer;
a scattering layer; and
a substrate for carrying the wavelength conversion layer and the scattering layer;
wherein the wavelength conversion layer is disposed between the scattering layer and the substrate.

22. The light source system of claim 1, wherein the first excitation light source is a laser diode or laser diode array.

23. A light source system comprising:
a first light source for generating a first wide spectrum light;
a second light source for generating a second wavelength light which is a wide spectrum light;
a light splitting and light combining device, disposed on light paths of the first light source and the second light source, for splitting the first wide spectrum light generated by the first light source into a third light travelling along a first path and a fourth wavelength light travelling along a second path, and for directing at least a part of the second wavelength light generated by the second light source to travel along the second path, wherein wavelength ranges of the third wavelength light and the fourth wavelength light are different;
a first spatial light modulator, for receiving light from the first path and modulate the received light;
a second spatial light modulator, for receiving light from the second path and modulate the received light; and
a control device, electrically coupled to the first light source, the second light source, the first spatial light modulator and the second spatial light modulator, for controlling the first light source and the second light source and controlling the first spatial light modulator and the second spatial light modulator to modulate light, wherein wavelength ranges of the first wide spectrum light and the second wavelength light are different.

24. The light source system of claim 23, wherein the second wavelength light is a cyan light, and the first wide spectrum light is a yellow light.

* * * * *